United States Patent [19]

Thuren et al.

[11] 4,071,013
[45] Jan. 31, 1978

[54] FUEL CONTROL APPARATUS FOR DUAL CHAMBER STRATIFIED CHARGE ENGINE SYSTEMS

[75] Inventors: John B. Thuren, Norman, Okla.; Walter F. Datwyler, Jr., Royal Oak; Jack R. Phipps, St. Claire Shores, both of Mich.

[73] Assignee: The Bendix Corporation, Southfield, Mich.

[21] Appl. No.: 633,138

[22] Filed: Nov. 18, 1975

[51] Int. Cl.$^2$ ............... F02B 19/10; F02B 19/16; F02M 13/06
[52] U.S. Cl. .............. 123/32 SP; 123/139 AW; 123/127; 123/75 B
[58] Field of Search ............ 123/32 ST, 32 SP, 75 B, 123/127, 32 EA, 139 AW

[56] References Cited

U.S. PATENT DOCUMENTS

| | | | |
|---|---|---|---|
| 2,980,090 | 4/1961 | Sutlon et al. | 123/119 R |
| 3,213,839 | 10/1965 | Gitlin et al. | 123/75 B |
| 3,510,112 | 5/1970 | Winquist et al. | 261/51 |
| 3,659,564 | 5/1972 | Suzuki et al. | 123/32 ST |
| 3,720,403 | 3/1973 | Winquist et al. | 261/50 A |
| 3,842,810 | 10/1974 | Yagi et al. | 123/127 |
| 3,980,058 | 9/1976 | Nakagawa et al. | 123/127 |

FOREIGN PATENT DOCUMENTS 887,997  12/1971  Canada .................. 123/32 ST

*Primary Examiner*—Ronald B. Cox
*Attorney, Agent, or Firm*—Anthony F. Cuoco

[57] ABSTRACT

Fuel control apparatus for dual chamber stratified charge engine systems utilizes a single point fuel control arrangement for the main (lean) air-fuel mixture in combination with a multi-point fuel injection arrangement for the igniting (rich) mixture. The single point and multi-point arrangements may be essentially independent in that they both sense and compute quantity of air flow, respectively, and meter and inject fuel respectively. In an alternate form of the invention, the air flow sensing function of the single point arrangement is used to provide suitable air flow information to the multi-point arrangement and in another alternate form of the invention the fuel flow injection function of the multi-point arrangement is used to provide suitable fuel flow information to the single point arrangement. The alternate forms of the invention reduce the overall complexity of the combined system by interrelating the single point and multi-point arrangements, thereby eliminating component and functional duplicity.

9 Claims, 3 Drawing Figures

FUEL CONTROL APPARATUS FOR DUAL CHAMBER STRATIFIED CHARGE ENGINE SYSTEMS

BACKGROUND OF THE INVENTION b 1. Field of the Invention

This invention relates to fuel control systems for dual chamber stratified charge engines and particularly to fuel control systems of the type described which can utilize single point fuel induction for the main (lean) mixture in combination with multi-point fuel injection for the igniting (rich) mixture.

2. Description of the Prior Art

Stratification of the air-fuel charge to internal combustion engines has long been recognized as an effective way of generally improving combustion and/or reducing engine exhaust air pollutants i.e., carbon monoxide (CO) unburned hydrocarbons (HC) and oxides of nitrogen ($NO_x$) by permitting lean, controlled combustion. The most effective implementation of the stratification principle in spark ignited engines currently on production vehicles is the dual chamber system developed by the Honda Motor Car Company and identified as their Compound Vortex Controlled Combustion System (CVCC). A system of this type is described in the July, 1973 issue of *Science and Mechanics,* pages 40–43 and in the April, 1974 issue of Road and Track, pages 32–36. In essence, the Honda CVCC approach provides the capability of effectively burning a lean airfuel mixture by spark igniting a rich mixture in a small pre-combustion chamber and using the burning rich mixture to ignite a much larger volume of the lean mixture in a main combustion chamber. Thus, "spark ignition" is supplemented with "torch ignition" allowing the combustion of lean mixtures at air-fuel ratios far above those normally experienced with conventional spark ignition only. In addition to achieving a substantial reduction in the aforenoted exhaust emission components without the need for add-on exhaust treatment equipment, good fuel economy and low system costs can be achieved under conditions of proper control and proportioning of the rich and lean mixtures.

Essentially, then, in dual chamber stratified charge engines such as the Honda CVCC engine, the fuel control system must function to provide suitable lean and rich mixtures to the main and pre-combustion chambers, respectively, of each engine cylinder in response to the driver's command and other necessary inputs. It must further be realized that a dual chamber stratified charge engine system is therefore significantly different in relation to fuel management than a conventional internal combustion engine. In particular, small quantities of a rich mixture must be generated and distributed while large quantities of a lean mixture must be generated and distributed. Further, the rich and lean mixtures must be optimally coordinated for best system performance.

The system of the invention is well suited for the purposes described in that it utilizes single point induction for the main lean mixture in combination with multi-point fuel injection for the igniting rich mixture. The advantages accruing from such a combination include the most precise generation and distribution of the rich mixture required in the pre-chamber and the most efficient generation and distribution of the lean mixture required in the main chamber. Further, use of fuel injection in association with the pre-chamber can allow significant simplification of the pre-chamber intake manifolding as in advantageous in multicylinder engines.

SUMMARY OF THE INVENTION

This invention contemplates a fuel control arrangement for dual chamber stratified charge engine systems including, in combination, a single point fuel induction system and a multi-point electronic fuel injection system. The single point system may be, for purposes of illustration, of the type described in U.S. Pat. No. 3,510,112 issued to Winquist et al. on May 5, 1970 and U.S. Pat. No. 3,720,403 issued on Mar. 13, 1973 to Winquist et al and assigned to J. H. Graffman. The system includes an air valve for sensing air flow, a fuel pulse generator and a fuel metering valve controlled by the air valve to meter the pulsed fuel in the air flow. The fuel metering valve is designed and disposed so that the fuel is finely atomized on being introduced into the air flow. A mechanical linkage between the air valve and fuel metering valve provides a desired air-fuel schedule. This schedule can be modified by mechanical inputs or electromechanical inputs or by modulation of an electrical input to the fuel pulse generator. The system is controlled by a throttle valve adjoining the engine intake manifold.

The electronic fuel injection system may be, for purposes of illustration, of the type described in U.S. Pat. No. 2,980,090 issued on Apr. 18, 1961 to R. W. Sutton et al and assigned to The Bendix Corporation, assignee of the present invention. A system of this type computes mass air flow by the "speed density" method, utilizing engine rpm, manifold pressure and engine temperature signals, and computes the required fuel flow from a stored electrical schedule. A pulse is thus provided of appropriate duration for controlling electrically actuated fuel valves (injectors) located just upstream of the individual cylinder intake ports.

The single point and multi-point systems function in response to direct (measured) and indirect (computed) air flow signals, respectively, rather than from a direct input command as from a throttle linkage. Thus, the two systems can function essentially independently of each other. Alternatively, in order to reduce the overall complexity of the combined system, the individual systems may be interrelated. Thus, the air flow sensing function of the single point arrangement may be used to provide suitable air flow information to the multi-point arrangement and the fuel flow computing function of the multi-point arrangement may be used to provide a suitable fuel flow command pulse to the single point arrangement.

In summation, a lean air-fuel mixture is established by the single point system on the basis of intake air flow measured upstream of the throttle valve. The mixture is then introduced into the main intake manifold and distributed to the several main cylinder chambers. The multi-point system senses existing pre-chamber manifold vacuum pressure, engine speed and temperature, and provides the required rich air-fuel mixture to the several pre-chambers by injecting fuel pulses at the respective pre-chamber intake port regions.

The main object of this invention is to provide a fuel control arrangement for dual chamber stratified charge engine systems which utilizes single point fuel induction for the main (lean) mixture in combination with multi-point fuel injection for the igniting (rich) mixture.

Another object of this invention is to provide a fuel control system of the type described including pre-combustion and main combustion chambers, and whereby multi-point fuel injection provides precise generation and distribution of the rich air-fuel mixture to the pre-combustion chamber while the single point induction system provides the required generation and distribution of the lean mixture to the main combustion chamber.

Another object of this invention is to combine the single point and multi-point fuel control arrangements so that they are essentially independent of each other for allowing maximum flexibility in providing a desired combination of a lean air-fuel ratio and a rich air-fuel ratio.

Another object of this invention is to reduce the overall complexity of the combined system by interrelating the single point and multi-point arrangments.

Another object of this invention is to interrelate the single point and multi-point arrangements by utilizing the air flow sensing function of the single point arrangement to provide suitable air flow information to the multi-point arrangement.

Another object of this invention is to interrelate the single point and multi-point arrangements by utilizing the fuel flow computing function of the multipoint arrangement to provide a suitable flow input command to the single point arrangement.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
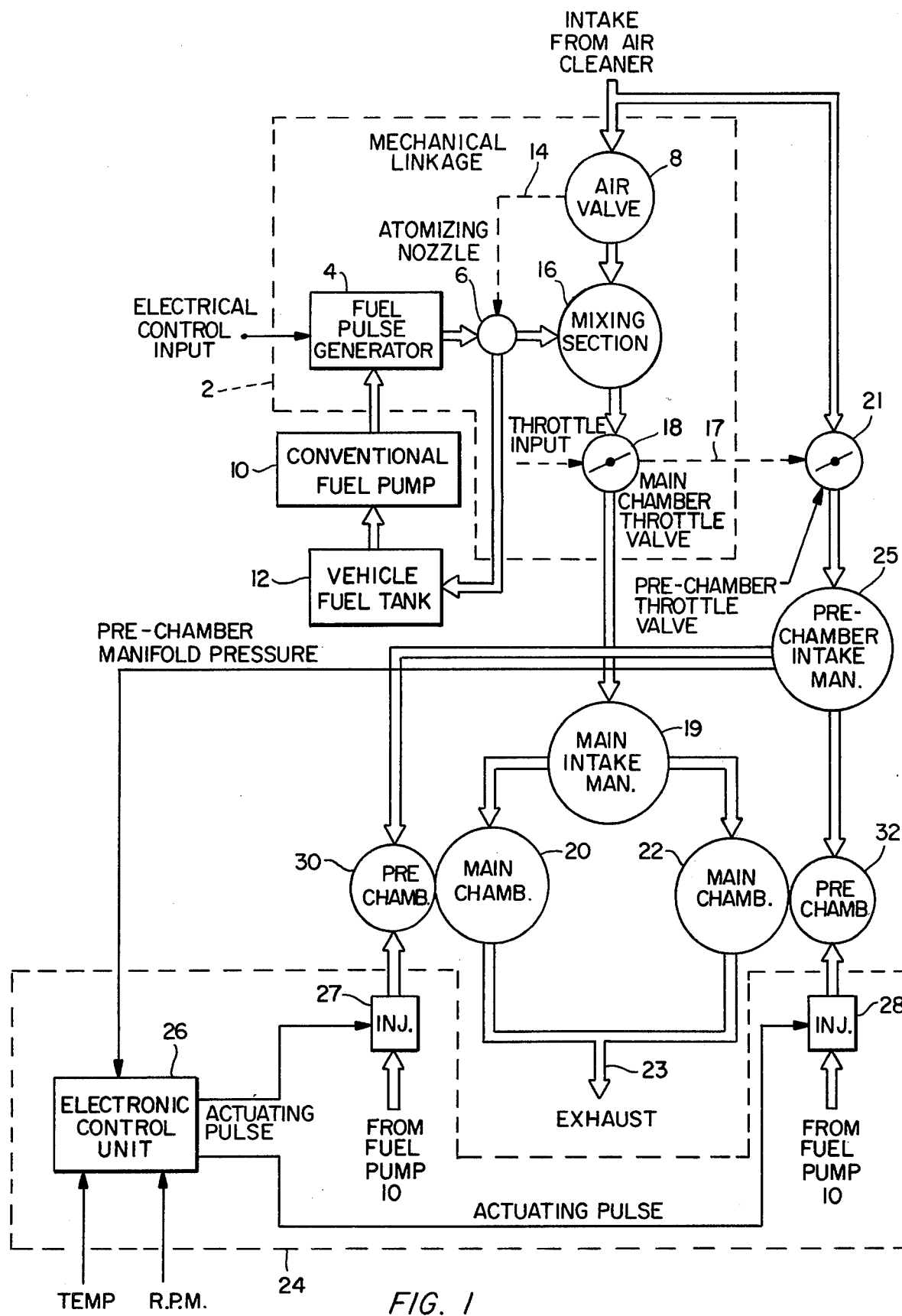
FIG. 1 is a block diagram of a fuel control system according to the invention and including a single point fuel induction arrangement and a multi-point fuel injection arrangement for the purposes aforenoted, with said single point and multi-point arrangements being essentially independent of each other.

With reference to FIG. 1, a single point induction system of the type which may be used with the invention is designated generally by the numeral 2. This arrangement may be of the type described in substantial detail in the aforenoted U.S. Pat. Nos. 3,720,304 and 3,510,112. It will suffice to say for purposes of the present invention that arrangement 2 includes three major elements i.e., a fuel pulse generator 4, a fuel atomizing nozzle 6 and an air valve 8.

Fuel pulse generator 4 may be a piston pump driven by a cam spring combination to achieve a nominally regulated pressure pulse train. Fuel is supplied to pulse generator 4 by a conventional fuel pump 10 coupled to a vehicle fuel tank 12. The cam is rotated by a control input from d.c. electric motor so that when the cam is driven at a reasonably high speed (3000 rpm), pulses occur which are applied to atomizing nozzle 6.

Atomizing nozzle 6 functions as a spring loaded relief valve which is biased in a closed position. The fuel pressure pulses applied to the nozzle cause the valve to periodically unseat and to discharge fuel. The amount of fuel discharged during a given pulse from fuel pulse generator 4 depends on the valve biasing spring action and the fuel pressure pulse magnitude. The pulsating discharge of fuel in conjunction with the relatively high peak fuel pressure pulses promotes fine atomization of the fuel as is desirable for the purposes intended. Nozzle 6 is coupled to fuel tank 12 so that excess fuel is returned to the tank.

Air valve sensor 8 may be of a conventional disc type moving within a valve bore. Air flowing from the vehicle intake air cleaner to the valve provides a force on the valve disc which is coupled to atomizing nozzle 6 by a mechanical linkage 14, and which linkage 14 may be of the spring loaded type. Linkage 14 is such that the greater the air flow, the lower the biasing force on nozzle 6, and hence the greater the amount of discharged fuel. The linkage may include cam means for air to fuel proportioning as is well known in the art.

The fuel as provided by fuel pulse generator 4 to atomizing nozzle 6 and the air as provided by the vehicle air cleaner to air valve 8 are mixed in a mixing section 16. The air-fuel mixture is applied to a main throttle valve 18 which receives a throttle input for controlling air and fuel flow.

The air-fuel mixture from main chamber throttle valve 18 is applied to a main intake manifold 19 and therefrom to the main combustion chambers of an internal combustion engine, and two of which chambers are shown for purposes of illustration and carry the numerical designations 20 and 22. The exhaust is from the main combustion chambers to a common exhaust member 23. For purposes of simplicity, intake and exhaust valves, pistons, etc. are not shown in the drawings.

The single point fuel induction arrangement as shown in the figure is such that a lean air-fuel mixture is efficiently generated and distributed to the main combustion chambers as will now be understood by those skilled in the art.

The multi-point fuel injection function of the invention is accomplished by an electronic fuel injection system designated generally by the numeral 24 and which system may be of the type described in the aforenoted U.S. Pat. No. 2,980,090. It will suffice to say for purposes of the present invention that an electronic fuel injection system of this type includes an electronic control unit 26 which is responsive to engine rpm, temperature and pre-chamber manifold pressure signals for computing mass of air per cycle by the "speed density" method and computes the required mass of fuel per cycle from a built-in electrical schedule. Electrical pulses of appropriate duration are thereby provided for electrically actuating fuel injectors 27 and 28 which receive fuel from fuel tank 12 via fuel pump 10. Injectors 27 and 28, which are preferably located just upstream of individual cylinder pre-chamber intake ports, supply fuel to pre-chambers 30 and 32 associated with main chambers 20 and 22, respectively. In this connection it is noted that injection can be directly into the pre-chambers, but this requires high pressure injection.

Pre-chamber air control and manifolding is accomplished by coupling a pre-chamber throttle valve 21 to the air flow cleaner upstream of valve 8 so that the pre-chamber air does not first pass through valve 8. Valve 21 is coupled to main chamber throttle valve 18 through suitable mechanical coupling means 17. It will be understood by those skilled in the art that coupling means 17 may include mechanical scheduling means as may be desired. In any event throttle means 18 and 21 are actuated by the same throttle input as shown in the figure.

Throttle valve 21 is coupled to a pre-chamber intake manifold 25 which, in turn, is coupled to pre-chambers 30 and 32.

It will now be understood by those skilled in the art that with a multi-point fuel injection arrangement as described, a precise generation and distribution of a rich air-fuel mixture is provided to pre-combustion chambers 30 and 32.

Thus, with the system as described in FIG. 1, the capability of effectively burning a lean mixture is achieved by "spark igniting" a rich mixture in a small pre-chamber and using the burning rich mixture to "torch ignite" a much larger volume of the lean mixture. Spark ignition is thereby supplemented with torch ignition, allowing the combustion of the lean mixture at air-fuel ratios far above those normally experienced with conventional spark ignition only.

With continued reference to FIG. 1, it will be seen that single point arrangement 2 and multi-point arrangement 24 operate essentially independent of each other. Single point arrangement 2 operates in response to air flow into the main intake manifold and multi-point injection system 24 operates in response to computed air mass per cycle based on engine speed, temperature and pre-chamber manifold pressure. The relative performance of the two arrangments can thereby be conveniently proportioned as desired without complicated interaction therebetween.

Alternatively, the overall complexity of the combined system as shown in FIG. 1 may be reduced by interrelating the single point and multi-point arrangements as will be described with reference to FIGS. 2 and 3.

Figure 2:
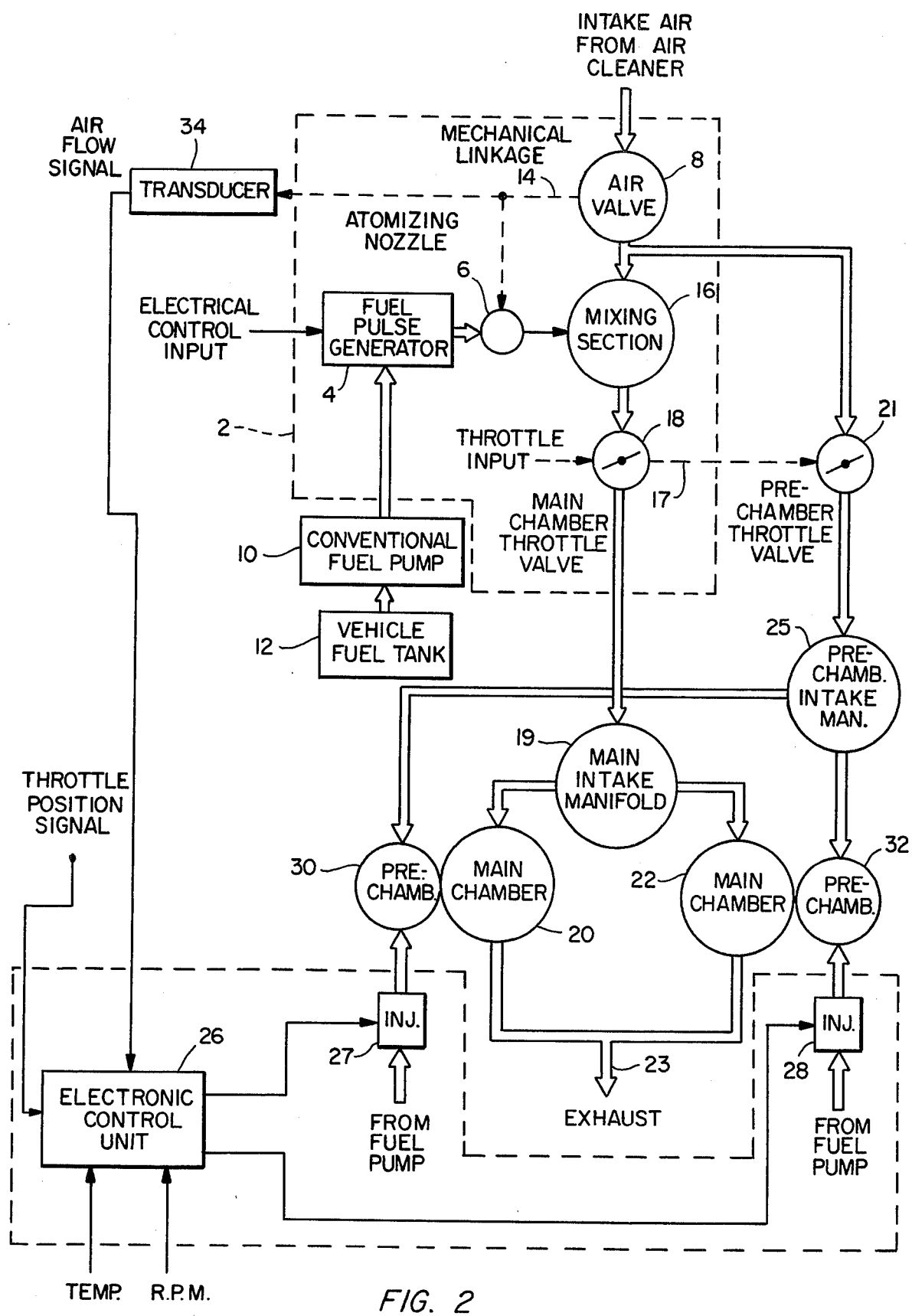
FIG. 2 is a block diagram of an alternate embodiment of the invention wherein the single point and multi-point arrangements are interrelated in that the air flow sensing function of the single point arrangement is used to provide suitable air flow information to the multi-point arrangement.

In one alternative form of the invention as shown in FIG. 2, the air flow sensing function of single point arrangement 2 is used to provide an air flow signal to electronic control unit 26 of multi-point injection system 24. Since the multi-point system ordinarily computes air quantity as heretofore noted, the pre-chamber manifold pressure sensing function shown in FIG. 1 can be eliminated.

Since air flow in signal point arrangement 2 is sensed by the force on, and the resultant motion of, air valve 8 in the intake air path, the air flow signal required by electronic control unit 26 may be provided by an appropriate mechanical to electrical transducer 34, which may be a conventional potentiometer or the like, receiving a mechanical input via linkage 14 and providing an electrical signal corresponding to air flow to electronic control unit 26. Pre-chamber air control and manifolding is accomplished as described with reference to FIG. 1 with one significant difference. Thus, in the embodiment of the invention shown in FIG. 2, throttle valve 21 is connected downstream of air valve 8 so that all air first passes through the air valve as shown. To assist in scheduling the pre-chamber fuel input it may be desired to include a throttle position signal to electronic control unit 6 as shown in FIG. 2.

Figure 3:
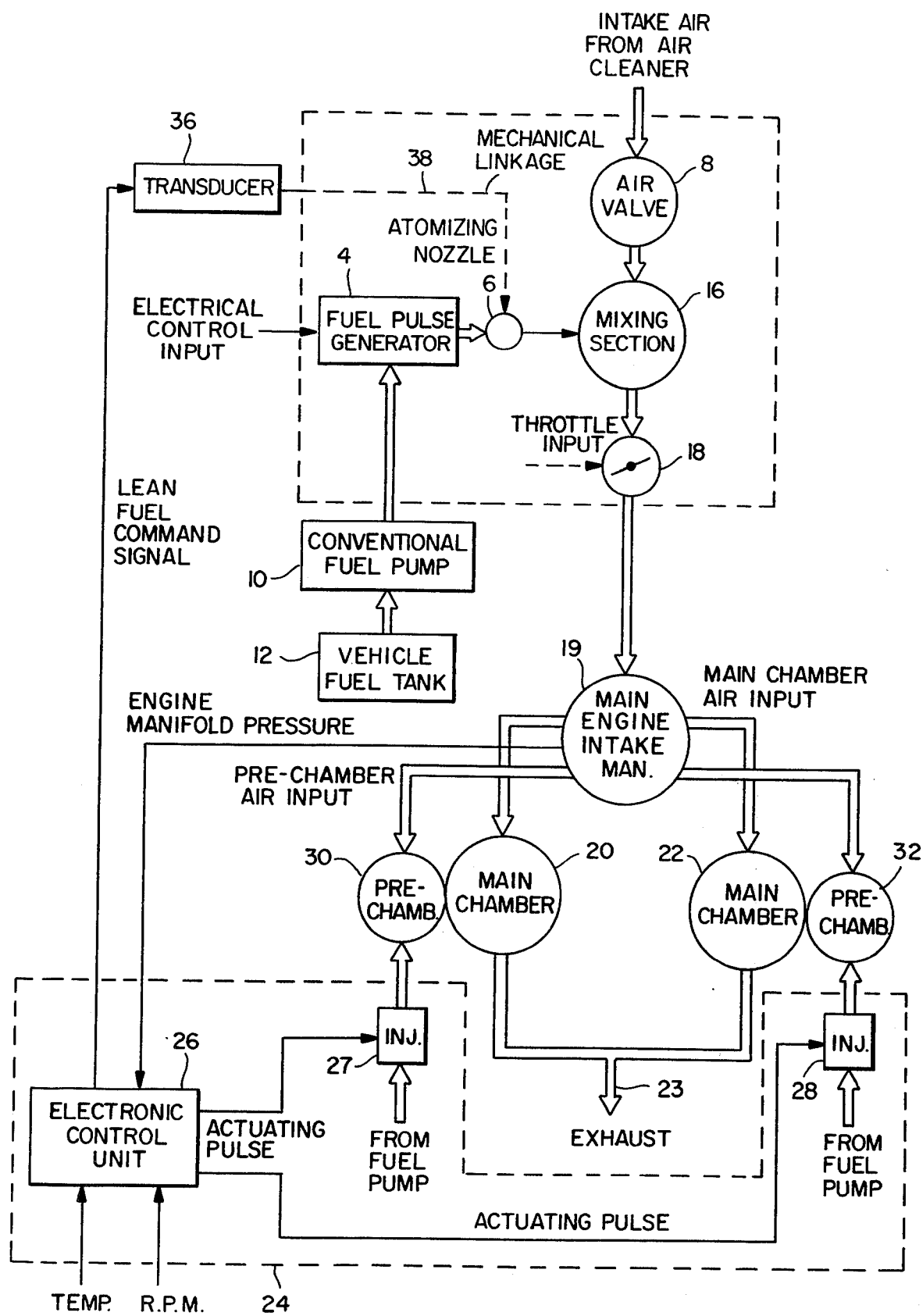
FIG. 3 is a block diagram of another alternate embodiment of the invention wherein the single point and multi-point arrangements are interrelated in that the fuel flow sensing function of the multi-point arrangement is used to provide a suitable fuel flow input command to the single point arrangement.

In another alternative form of the invention as shown in FIG. 3, electronic control unit 26 of multi-point injection system 24 is arranged to generate a lean fuel command signal in response to main engine manifold pressure, temperature and rpm signals, and which signal is computed on a "speed density" basis as heretofore noted. The fuel command signal is applied to a transducer 36 which may be a conventional electro-mechanical actuator. Transducer 36 is coupled through a suitable mechanical linkage 38 to atomizing nozzle 6. It is noted that the lean fuel command signal from control unit 26, prior to being applied to transducer 36, may be suitably modified by, for example, a conventional resistance-capacitance filter and amplifier circuit (not shown) so as to be usable by the transducer as will be understood by those skilled in the art.

In the form of the invention shown in FIG. 3, the computing capability of electronic control unit 26 is available for control of the combined system. Thus, mechanical linkage 14 between air valve 8 and atomizing nozzle 6 as shown in FIGS. 1 and 2 may be eliminated.

In this connection it will be understood that although some form of air valve 8 may be still desired for aerodynamic considerations in the single point arrangement intake path, mechanical linkage 14 between air valve 8 and atomizing nozzle 6 can still be eliminated as aforenoted.

With reference to FIGS. 1, 2 and 3, it will be seen that the invention described can be adapted for closed loop air-fuel control techniques (e.g. exhaust gas control of air-fuel ratios). This can be accomplished, for example, by a suitable input to single point system 2 by either modulating the electrical control input to fuel pulse generator 4 or by the addition of an electro-mechanical input to arrangement 2 to act on linkage 14 between air valve 8 and atomizing nozzle 6 or directly on atomizing nozzle 6 as will be readily understood by those skilled in the art.

Alternatively, the closed loop advantage of the invention can be realized by the introduction of a suitable electrical input to electronic control unit 26 as will also be readily understood by those skilled in the art.

It will be seen from the aforegoing description of the invention with reference to FIGS. 1, 2 and 3 that the combination of a single point fuel induction system and multi-point electronic fuel injection system provides appropriate air-fuel charges to an internal combustion piston type engine with a dual chamber stratified charge system. The combination described has several distinct advantages. The main air-fuel mixture as generated and distributed by the single point induction system provides a very well atomized and accurately controlled charge. The special atomization capability of this arrangement insures that a homogeneous mixture will be uniformly distributed to the various main combustion chambers of the engine. The use of multi-point electronic fuel injection insures that a precise quantity of fuel will be present at the respective pre-chambers. This injection arrangement eliminates the distribution problems which might otherwise result in passing an ultra-rich mixture through a manifold. Further, use of multi-point fuel injection affords potential simplification of the air manifolding for the rich pre-chamber mixture as will be discerned from the description of the invention and the drawings with particular reference to the embodiment of the invention shown in FIG. 3. Moreover the electronic pulses generated by the electronic fuel injection arrangement permit sequenced injection of fuel to the pre-chambers as may be advantageous. Because of the controllability from external electrical inputs as heretofore described, use of the single point and multi-point systems is compatible with closed loop control techniques such as those using oxygen sensors to control exhaust air-fuel ratios or various engine roughness sensors to maximum lean operation or EGR.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Fuel control apparatus for dual chamber stratified charge internal combustion engines, wherein each of the cylinders of the engine includes a pre-combustion chamber connected with a main combustion chamber, comprising in combination:
   single point fuel induction means for introducing a lean air-fuel mixture into the main combustion chambers;
   multi-point fuel injection means for providing timed pulses of appropriate duration for injecting a rich air-fuel mixture into each pre-combustion chamber;
   the rich air-fuel mixture in the pre-combustion chamber being spark ignited;
   the lean air-fuel mixture in the main combustion chamber being torch ignited by the spark ignited rich air-fuel mixture; and
   the single point fuel induction means including means responsive to sensed air flow signals and the multi-point fuel injection means including means responsive to computed air flow signals, whereby the single point and multi-point means are arranged to operate in one mode of a first mode and a second mode, the first mode occurring when the single point and the multi-point means operate independent of each other and the second mode occurring when said single point and multi-point means operate interrelated to each other.

2. Fuel control apparatus as described by claim 1, wherein the means for introducing a lean air-fuel mixture into the main combustion chamber includes:
   air intake means;
   air flow control means coupled to the air intake means;
   fuel intake mens;
   fuel flow control means coupled to the fuel intake means and to the air flow control means and actuated by the air flow control means;
   means for mixing the controlled air and fuel flow;
   main combustion chamber throttle means coupled to the mixing means; and
   main combustion chamber intake manifold means coupled to said throttle means and to the main combustion chambers.

3. Fuel control apparatus as described by claim 2, including:
   pre-chamber combustion chamber throttle means coupled upstream of the air flow control means and connected to the main combustion chamber throttle means, and operable therewith; and
   pre-combustion chamber intake manifold means coupled to the pre-chamber throttle means and to the pre-combustion chambers.

4. Fuel control apparatus as described by claim 1, including:
   means for providing an engine speed signal;
   means for providing a temperature signal;
   means for providing a pre-combustion chamber manifold pressure signal; and
   the means for providing timed pulses of appropriate duration for injection a rich air-fuel mixture into the pre-combustion chambers being responsive to the speed, temperature and pre-chamber manifold pressure signals for providing said pulses.

5. Fuel control apparatus as described by claim 2, including:
   pre-chamber combustion chamber throttle means coupled downstream of the air flow control means and connected, to the main combustion chamber throttle means and operable therewith; and
   pre-combustion chamber intake manifold means coupled to the pre-chamber throttle means and to the pre-combustion chambers.

6. Fuel control apparatus as described by claim 5, including:
   a transducer coupled to the air flow control means and responsive to the control affected thereby for providing an air flow signal;
   means for providing an engine speed signal;
   means for providing a temperature signal; and
   the means for providing pulses of appropriate duration for injecting a rich air-fuel mixture into the pre-combustion chambers being responsive to the air flow, speed and temperature signals for providing said pulses.

7. Fuel control apparatus as described by claim 2, including:
   the pre-combustion chambers coupled to the main combustion chamber intake manifold.

8. Fuel control apparatus as described by claim 7, including:
   means for providing an engine speed signal;
   means for providing an engine temperature signal;
   means for providing a main combustion chamber intake manifold pressure signal; and
   the means for providing timed pulses of appropriate duration for injecting a rich air-fuel mixture into the pre-combustion chambers being responsive to the speed, temperature and main combustion chamber manifold pressure signals for providing the pulses.

9. Fuel control apparatus as described by claim 8, wherein:
   the means for providing timed pulses of appropriate duration for injecting a rich air-fuel mixture into the pre-combustion chambers being responsive to the speed, temperature and main manifold pressure signals for providing the pulses, and for providing a lean air-fuel command signal; and
   transducer means coupled to the pulse and command signal providing means and connected to the fuel flow control means and responsive to the lean fuel command signal for actuating the fuel flow control means.

* * * * *